United States Patent
Itabayashi et al.

(10) Patent No.: US 10,455,001 B2
(45) Date of Patent: Oct. 22, 2019

(54) SUPPORT DEVICE

(71) Applicant: Hitachi, Ltd., Tokyo (JP)

(72) Inventors: Yuki Itabayashi, Tokyo (JP); Taichi Maeda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1093 days.

(21) Appl. No.: 14/831,196

(22) Filed: Aug. 20, 2015

(65) Prior Publication Data

US 2016/0055265 A1  Feb. 25, 2016

(30) Foreign Application Priority Data

Aug. 22, 2014 (JP) ................................. 2014-168969

(51) Int. Cl.
*H04L 29/08* (2006.01)
*G06Q 10/06* (2012.01)

(52) U.S. Cl.
CPC ............. *H04L 67/10* (2013.01); *G06Q 10/06* (2013.01)

(58) Field of Classification Search
None
See application file for complete search history.

(56) References Cited

U.S. PATENT DOCUMENTS

| | | | | |
|---|---|---|---|---|
| 5,784,286 A * | 7/1998 | Hirose | ..................... | G06F 17/50 703/1 |
| 6,115,393 A * | 9/2000 | Engel | ................... | H04L 41/0213 370/469 |
| 8,166,078 B2 * | 4/2012 | Nakazawa | ............. | G06Q 10/06 704/9 |
| 2003/0135612 A1 * | 7/2003 | Huntington | ......... | H04L 41/0803 709/224 |
| 2007/0038660 A1 | 2/2007 | Nakayama et al. | | |
| 2007/0244733 A1 * | 10/2007 | Nishiura | ............. | G06F 17/5009 709/223 |

FOREIGN PATENT DOCUMENTS

| | | |
|---|---|---|
| JP | 2007-41841 A | 2/2007 |
| JP | 2008-134840 A | 6/2008 |

OTHER PUBLICATIONS

"Distributed research and development solution 1.5 deployment guide," 2009, Cisco, pp. 1-142).*

(Continued)

*Primary Examiner* — Kamini S Shah
*Assistant Examiner* — Russ Guill
(74) *Attorney, Agent, or Firm* — Mattingly & Malur, PC (57) ABSTRACT

A design support device of the present invention is a design support device that is connected to a network to which both an input/output device where input/output regarding designing is performed and a design data accumulation device for storing design data regarding the designing are connected, the design support device including a network monitoring unit that monitors the network, detecting input/output data that is input/output between the network and the input/output device and outputting a monitoring log, and a design process list creation unit that extracts design processes based on a relationship between information regarding the input data and information regarding the output data included in the monitoring log, and creating and outputting a design process list by arranging the extracted design processes in a list.

8 Claims, 9 Drawing Sheets

(56) References Cited

OTHER PUBLICATIONS

Raymond Sung et al., "Automated design knowledge capture and representation in single-user CAD environments," 2011, Journal of Engineering Design, vol. 22, issue 7, pp. 487-503.*

Xiangjun Fu et al., "Automated capture of design knowledge from design process," 2008, Fifth international conference on fuzzy systems and knowledge discovery, pp. 415-419.*

Y. Jin et al., "DAKA: design activity knowledge acquisition through data mining," 2006, International Journal of Production Research, vol. 44, No. 15, pp. 2813-2837.*

* cited by examiner

SUPPORT DEVICE

CLAIM OF PRIORITY

The present application claims priority from Japanese Patent applications serial No. 2014-168969, filed on Aug. 22, 2014, the respective contents of which are hereby incorporated by reference into this application.

BACKGROUND OF THE INVENTION

Field of the Invention

The present invention relates to a design support device for supporting product design by use of a computer, the Internet or the like.

Description of the Related Art

Conventionally, as a technique for managing a design document or a design process, there is one that automatically extracts, at the time of design change, an item of the design document to be changed from a database by keyword search, and supports this change to be made with no omissions (for example, see Japanese Patent Laid open No. 2007-41841, hereinafter referred to as Patent Document 1).

Also, conventionally, as a technique for managing a design document or a design process, there is one that sets a design process of a product combining existing devices, based on the information on design data that is to be used to design a product or a database recording function information of a device for configuring a product, (for example, see Japanese Patent Laid open No. 2008-134840, hereinafter referred to as Patent Document 2).

To meet various product needs of recent years from clients, the procedure for designing a product is made ever more complicated. Also, due to the global expansion of companies, not only manufacturing but also designing is being performed at overseas based factories, and designers at several locations sometimes handle the designing of one product.

Generally, to improve a design process, visualization and analysis of a current design process are first considered effective. A design process clarifies the steps at the time of designing of a product. Here, a document created in the process of design, such as a drawing or a specification, is taken as a deliverable, and a collection of steps for creating one deliverable is defined as a task.

That is, a design process is a collection of successive tasks. At the time of creating a deliverable, a designer describes the shape or the performance of a product that he/she has devised in a drawing or a design document, and this is stored as design data. Also, among successive tasks, a task other than the first task is often for creating a new deliverable based on the deliverable created in the immediately preceding task. Accordingly, to visualize a design process, it is important to break down the design process into tasks, and to grasp the order of the tasks and the deliverables to be created.

Until now, visualization of a design process was possible by carrying out hearing from specific designers handling a target product at one location. However, if a design process is complex, and there are several designers involved, grasping of the design process by hearing becomes a burdensome work and is difficult.

Moreover, considering that the design locations are spread, it is not possible to frequently carry out hearing from all the designers involved in the product, and visualization of the design process solely by hearing would take a long time.

As a conventional technique for managing a design document or a design process, Patent Document 1 discloses a support technique for automatically extracting, at the time of design change, an item of the design document to be changed from a database by keyword search, and for making the change with no omissions. Also, Patent Document 2 discloses a technique for setting a design process of a product combining existing devices, based on the information on design data that is to be used to design a product or a database recording function information of a device for configuring a product.

According to Patent Document 1, keyword search is performed in a database accumulating design documents, and an item that is related to a design process and that is to be managed is extracted. However, there is not enough information for visualization of a design process, such as by what process a document was created and the relationship between the preceding or following process. Accordingly, visualization of a design process is difficult with this conventional technique.

Also, according to Patent Document 2, a design process of a new product is set by referring to data used in designing a product designing of which is already complete and a database recording the function information of the product. However, since the design data related to an existing product is used, this cannot cope with setting of a design process of a product which had never been designed up to then.

Accordingly, enabling easy visualization of a current design process which is to be the base for improving a design process becomes an issue.

SUMMARY OF THE INVENTION

To overcome the issue described above, a design support device of the present invention is, for example, a design support device connected to a network where an input/output device where designing is carried out and a design data accumulation device for storing design data related to the designing are connected, where the design support device includes a network monitoring unit, a design process list creation unit, and a design process list display unit, and creates a design process list from design data by performing association of input/output data for the input/output device acquired from the network on a per task basis, and arranging the task in an order of performance.

According to the present invention, a design process list may be created by the design support device, and the effort needed to visualize a design process may be reduced.

DESCRIPTION OF THE PREFERRED EMBODIMENTS

A design support device of the present invention is a design support device having a function of creating a design process list indicating a design process on a per task basis by grasping a design process by network monitoring of communication between an input/output device handled by a designer, such as a calculator, and a design data accumulation device for accumulating design data, associating input/output data for the input/output device, and arranging data in the order of performance of input/output.

More specifically, the design support device of the present invention is a design support device that is connected to a network to which both an input/output device where input/output regarding designing is performed and a design data accumulation device for storing design data regarding the designing are connected, the design support device including a network monitoring unit that monitors the network and detecting input data which is design data that is input to the input/output device from the network and output data which is design data that is output from the input/output device to the network, and a design process list creation unit that extracts, based on the relationship between information regarding the input data included in a monitoring log that is output from the network monitoring unit and information regarding the output data included in the monitoring log, each of design processes corresponding respectively to a plurality of design items in the designing, creating a design process list by arranging in a list a plurality of design processes which have been extracted, and outputting the created design process list together with the information regarding the input data and the information regarding the output data.

In the above configuration, the network monitoring unit may include a data communication direction processing unit, a file name processing unit, an input/output date/time processing unit, an output destination information processing unit, and a simultaneously-screen-displayed-file information processing unit, where the design data is extracted from the network.

In this case, the output destination information processing unit preferably compares the storage locations of the input/output data, and determines whether an input data portion and an output data portion of the input/output data are related to a common design operation.

Also, in the above configuration, the design process list creation unit may include an input/output data association processing unit, a task name processing unit, and a designing period processing unit, and may perform association of input/output data extracted from the network, create a task name from the output data portion of the input/output data, and calculate the designing period based on the registration time of the input/output data.

Furthermore, in the above configuration, a design process list display unit that displays the design process list created by the design process list creation unit may further be included.

In the following, embodiments of the design support device of the present invention will be described in detail as examples with reference to the drawings.

First Embodiment

Figure 1:
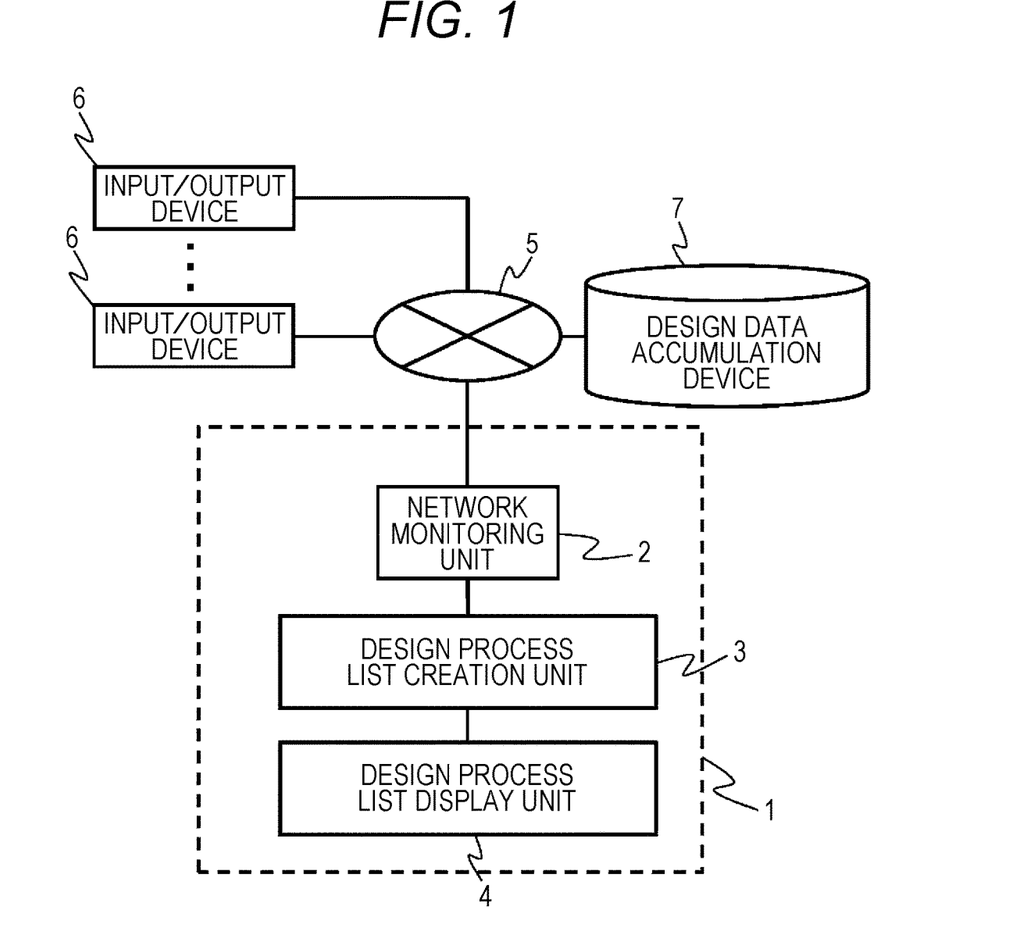
FIG. 1 is a block diagram showing a configuration of an embodiment of a design support device of the present invention.

FIG. 1 shows a configuration of a design support device according to first embodiment, which is an embodiment of the present invention. A design support device 1 is configured by including a network monitoring unit 2 and a design process list creation unit 3, but it may also include a design process list display unit 4. The design support device 1 is connected via a network 5 to an input/output device 6 to be handled by a designer, such as a computer device. Also, the network 5 is connected to a design data accumulation device 7 such as a magnetic recording medium, for example.

The network monitoring unit 2 monitors the data communication status of the input/output device 6 and the design data accumulation device 7, and acquires the file name and input/output date/time of data flowing into or out of the input/output device 6.

The design process list creation unit 3 creates a list of design processes carried out at the input/output device 6 by using data obtained from the network monitoring unit 2, and displays the list on the design process list display unit 4. Additionally, the network monitoring unit is connected to a network, but in the case where the number of input/output devices 6 is small, it may be directly connected to the input/output devices.

Figure 2:
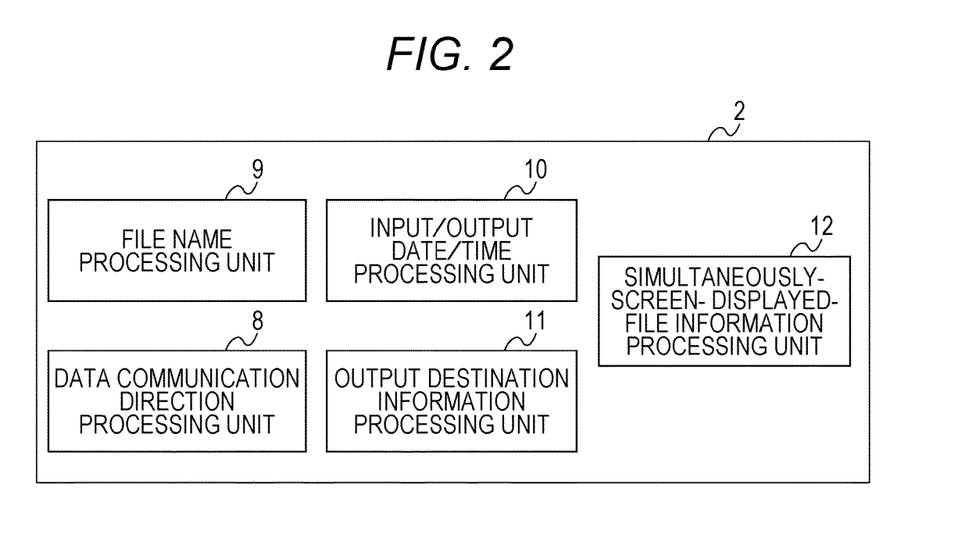
FIG. 2 is a block diagram showing a configuration of an embodiment of a network monitoring unit of the design support device of the present invention.

FIG. 2 shows a configuration of an embodiment of the network monitoring unit 2. The network monitoring unit 2 is configured from a data communication direction processing unit 8, a file name processing unit 9, an input/output date/time processing unit 10, an output destination information processing unit 11, and a simultaneously-screen-displayed-file information processing unit 12.

The data communication direction processing unit 8 acquires the direction of data, in the network 5, that is communicated between the input/output device 6 and the design data accumulation device 7. The direction of data from the design data accumulation device 7 to the input/output device 6 is taken as input, and the direction of data from the input/output device 6 to the design data accumulation device 7 is taken as output.

The file name processing unit 9 acquires the file name of data that is communicated between the input/output device 6 and the design data accumulation device 7.

The input/output date/time processing unit 10 records the date/time of input of data into the input/output device 6 from the design data accumulation device 7, and date/time of output of data from the input/output device 6 to the design data accumulation device 7.

In the case where there are a plurality of design data storage areas in the design data accumulation device 7, the output destination information processing unit 11 acquires the area name, such as a folder name, where the output data is stored. The simultaneously-screen-displayed-file information processing unit 12 acquires the file names of pieces of data that are simultaneously displayed on a screen of the input/output device 6.

Figure 3:
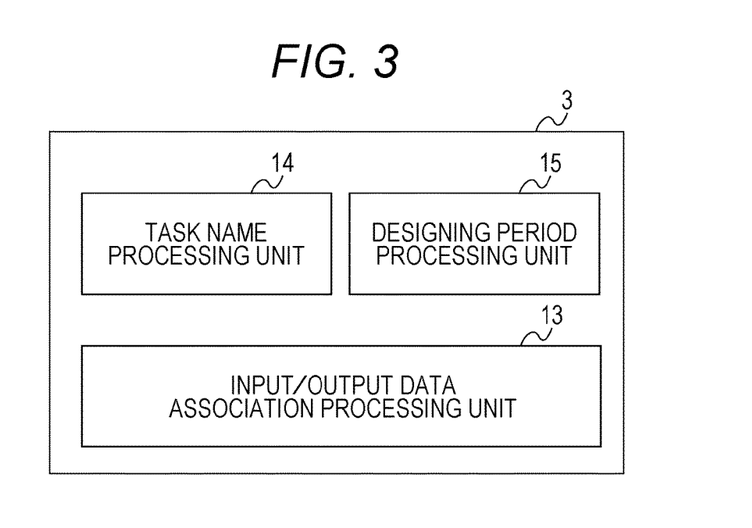
FIG. 3 is a block diagram showing a configuration of an embodiment of a design process list creation unit of the design support device of the present invention.

FIG. 3 shows a configuration of an embodiment of the design process list creation unit 3. The design process list creation unit 3 is configured from an input/output data association processing unit 13, a task name processing unit 14, and a designing period processing unit 15. The input/output data association processing unit 13 associates input data processed by the network monitoring unit with output data that is created using the input data.

The task name processing unit 14 creates a task name using the file name of output data of associated input/output data. Since one deliverable is always created by a task, a task name may alternatively be obtained by adding "creation of" to the file name of output data, for example. The designing period processing unit 15 calculates the period from the start to completion of a task, based on the input/output date/time of input/output data.

The specifics of a process by the design support device of the present example configured in the above manner will be given below.

Figure 4:
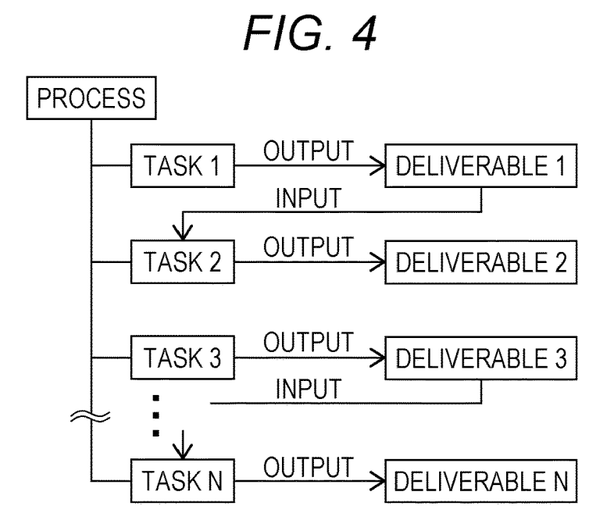
FIG. 4 is an input/output relationship diagram of a task and data configuring a design process.

FIG. 4 shows the relationship between a task and a deliverable in a design process. Deliverables created by respective tasks are shown as outputs from the tasks. Also, at the time of creating a deliverable by a task, the deliverable created in a preceding task is sometimes used, and this is shown as an input. The deliverables are to be stored in the design data accumulation device 7, and are thus transmitted/received to/from the input/output device 6 and the design data accumulation device 7 as input/output data.

Figure 5:
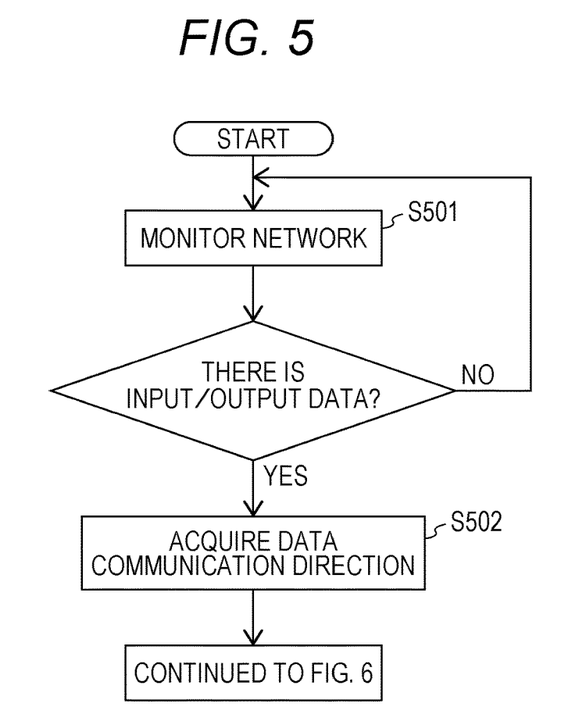
FIG. 5 is a diagram showing a flow chart related to a process of an embodiment of the design support device of the present invention.

FIG. 5 is a flow chart showing an example of a process of the design support device of the present invention. Firstly, the present design support device performs monitoring of the network, that is, whether an input/output file is exchanged at the network between the input/output device and the design data accumulation device is monitored (S501). When exchange of input/output data is detected, the communication direction of the data is acquired (S502), and monitoring is continued until input/output data is detected.

Figure 6:
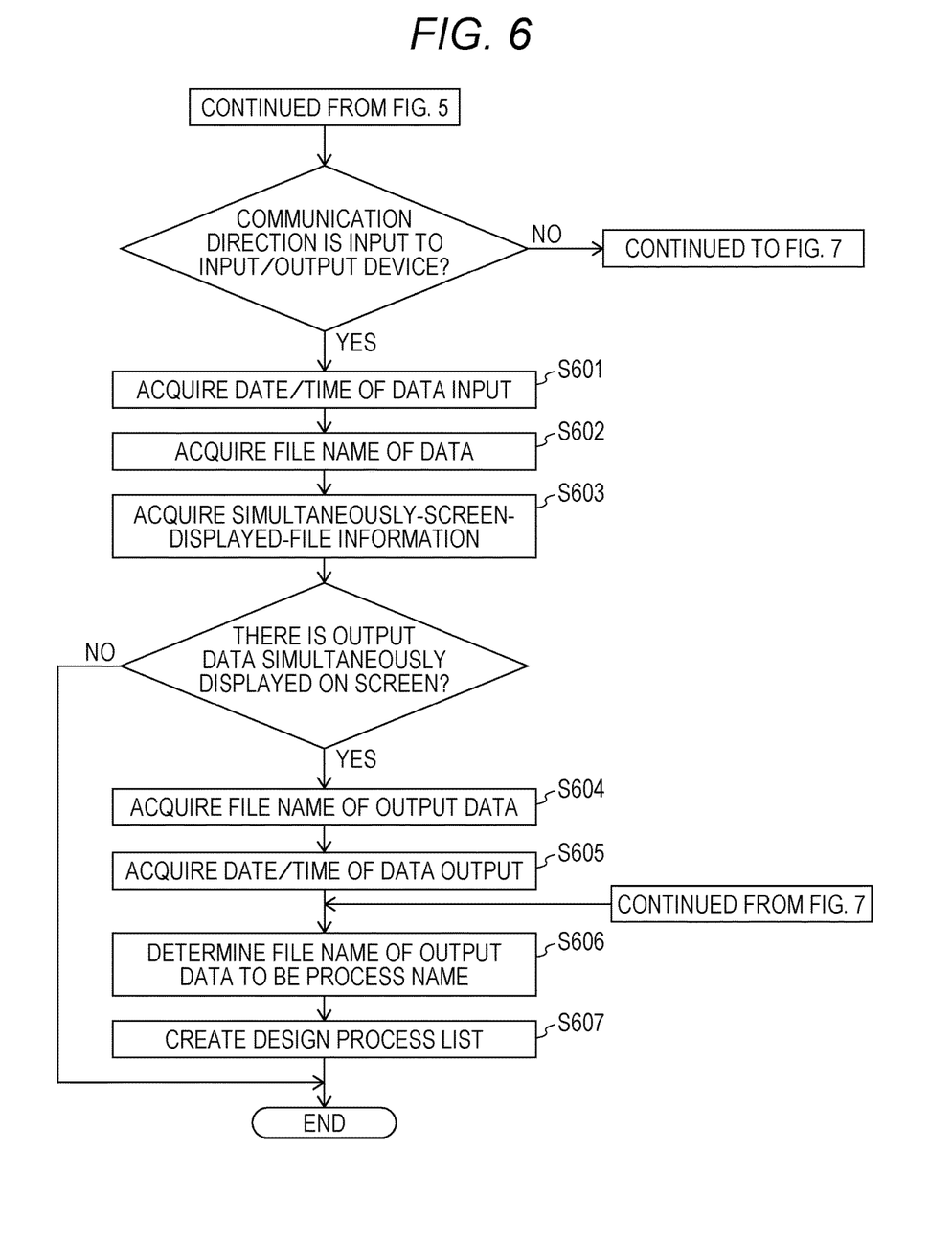
FIG. 6 is a diagram showing a flow chart related to a process of an embodiment of the design support device of the present invention.

FIG. 6 shows an example of the process after the acquisition of the data communication direction. If the communication direction is the direction of input to the input/output device, input data is determined, and the date/time of data input (S601), the file name of the data (S602), and simultaneously-screen-displayed-file information (S603) are acquired.

In the case where there is output data that is displayed on the screen at the same time, the file name of the output data is acquired (S604), and the date/time of data output is acquired (S605). Next, the file name of the output data is made the process name (S606), and a design process list is created (S607).

Figure 7:
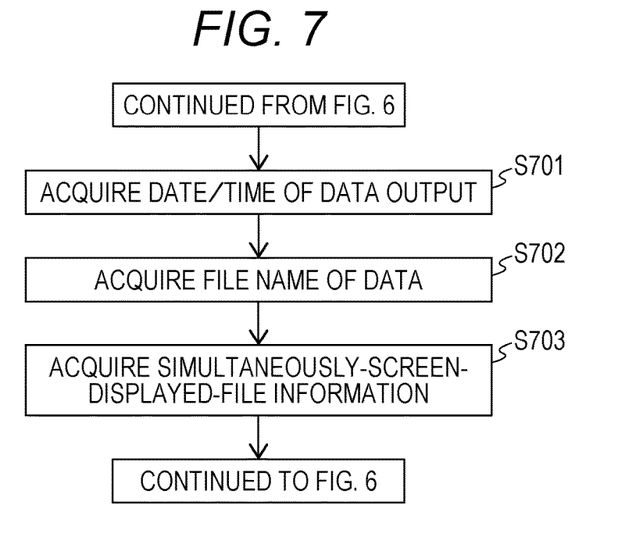
FIG. 7 is a diagram showing a flow chart related to a process of an embodiment of the design support device of the present invention.

FIG. 7 shows a process of a case where the communication direction of data is output. As in the case shown in FIG. 6 where the data communication direction is input, the date/time of data output (S701), the file name of the data (S702), and simultaneously-screen-displayed-file information (S703) are acquired.

The data communication direction, the file name, the input/output date/time, and the simultaneously-screen-displayed-file name of data that is transmitted/received to/from the input/output device 6 and the design data accumulation device 7 may be acquired from the network 5 by the process so far.

Figure 8:
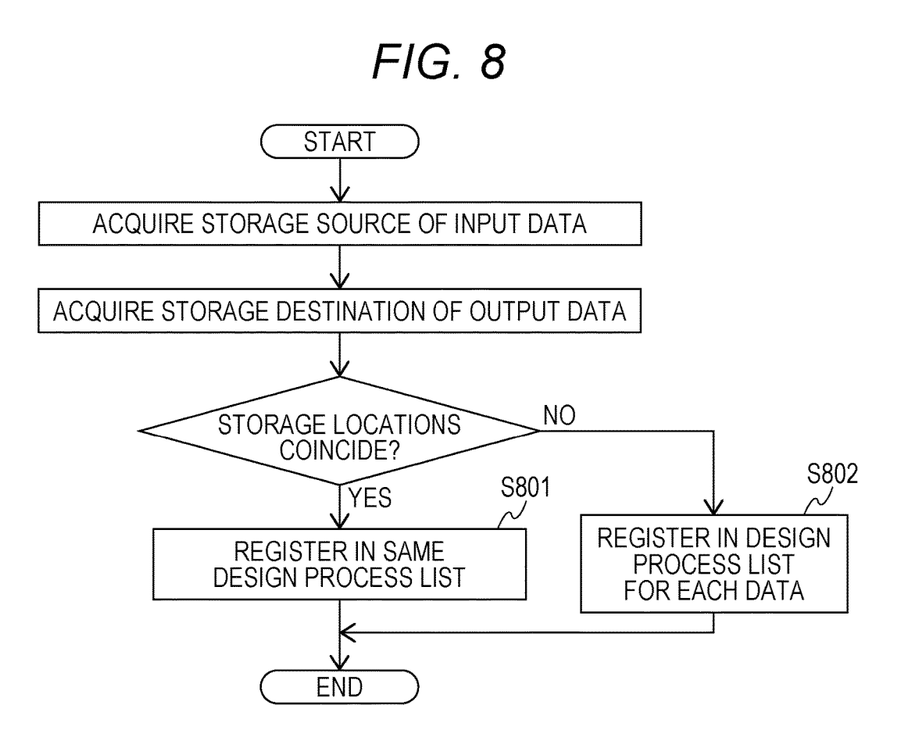
FIG. 8 is a diagram showing a flow chart related to a process of an embodiment of the design support device of the present invention.

FIG. 8 shows a flow chart of an example of a process of classifying operations based on data output destination information. Data that is input to the input/output device 6 is transmitted from a certain data storage area of the design data accumulation device 7. Also, data that is output from the input/output device 6 is stored in a certain data storage area of the design data accumulation device 7. For example, in the design data accumulation device 7 such as a magnetic recording medium, the storage area of design data is divided on a per product basis using folders.

Accordingly, in the case where pieces of output design data are stored in the same folder, these pieces of data are determined to be data related to the same design operation, and are registered in the design process list for the same operation (S801). On the other hand, if the storage locations do not coincide, the pieces of data are registered in the design process lists of respective operations (S802).

In the case where a designer simultaneously performs a plurality of design operations, to which operation input/output data is related may be identified in this manner from the storage destination of the data.

Figure 9:
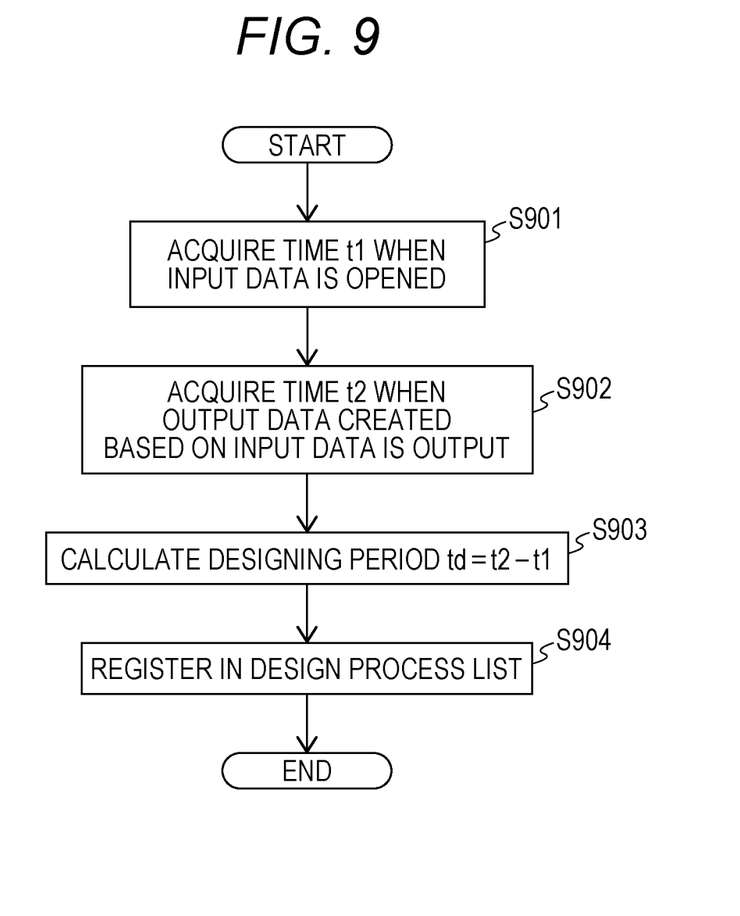
FIG. 9 is a diagram showing a flow chart related to a process of an embodiment of the design support device of the present invention.

FIG. 9 shows a flow chart of an example of a process of calculating a designing period from the input/output time of data. Firstly, time t1 when a designer has opened input data is acquired (S901). Next, time t2 of output of output data created based on the input data is acquired (S902). A designing period td, which is the difference between the times t1 and t2, is calculated (S903). Lastly, the designing period td is registered in the design process list (S904).

According to the present First embodiment, the design process list may be created by the design support device, and thus hearing from a designer may be minimalized to, for example, checking of the created design process list. Accordingly, the effort needed to visualize the design process may be reduced.

Second Embodiment

In the following, Second embodiment, which is an example of application of the design process list creation process by the design support device of First embodiment described above to designing of air conditioning equipment, will be described. The air conditioning equipment here refers to equipment for keeping within an arbitrary range the air temperature and humidity in a clean room, factory for food or chemical products, a data center or the like.

Figure 10:
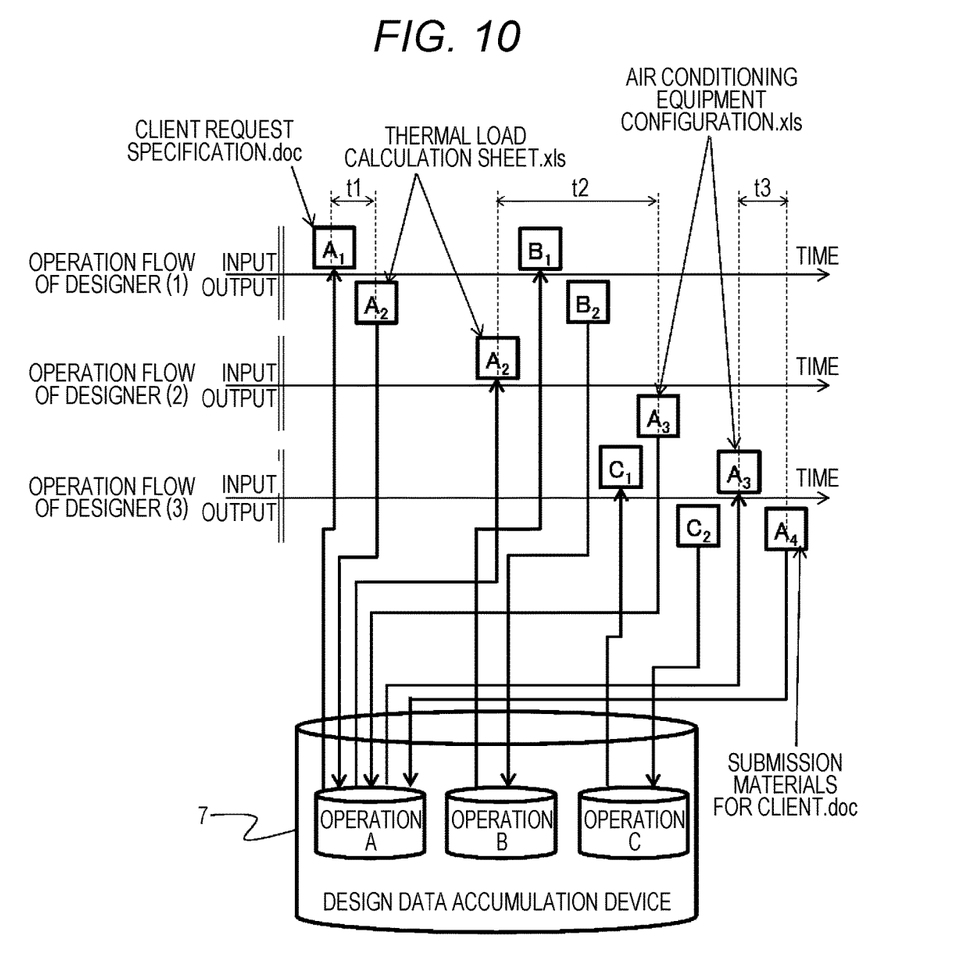
FIG. 10 is a relationship diagram showing, with respect to a design operation of air conditioning equipment, a design data accumulation device and a flow of an operation of a designer.

FIG. 10 shows the relationship, with respect to a time axis, of data input/output performed by three designers at the time of designing of air conditioning equipment.

A designer (1) acquires, as the input data, "client request specification.doc" from the folder of an operation A in the design data accumulation device 7, and creates "thermal load calculation sheet.xls" by referring to the input data. The input/output time difference at this time is t1.

A designer (2) takes the "thermal load calculation sheet.xls" as the input data, and creates "air conditioning equipment configuration.xls". The input/output time difference at this time is t2.

A designer (3) takes the "air conditioning equipment configuration.xls" as the input data and creates "submission materials for client.doc", and the data input/output time difference at this time is t3. These pieces of input/output data are all stored in the operation A folder in the design data accumulation device 7.

Now, the designer (1) also performs an operation B which is not related to the operation A. Similarly, the designer (3) also performs an operation C. Also in the case where the same designer performs a plurality of operations in this manner, the operations may be classified into the folders in the design data accumulation device, and the design process list of each operation may be independently created.

Figure 11:
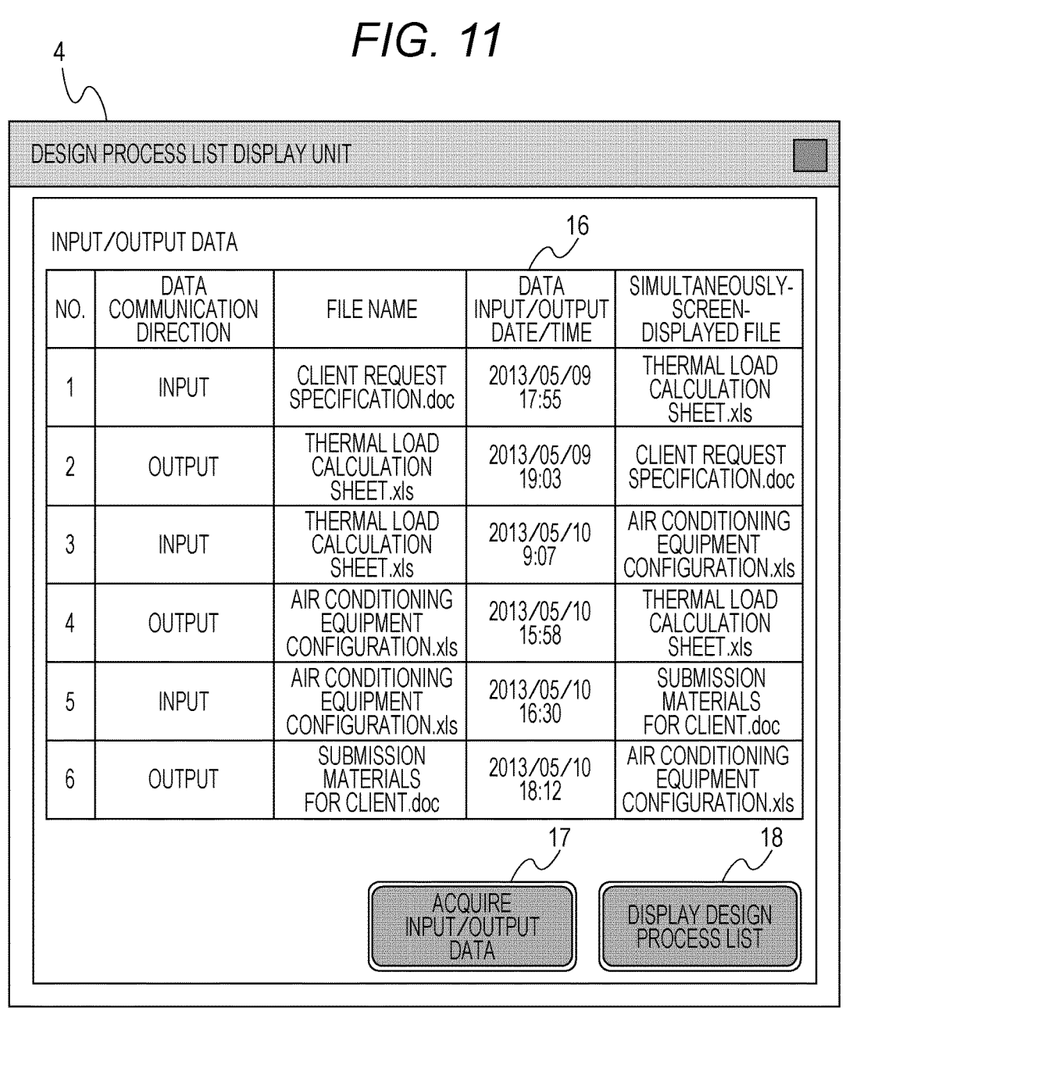
FIG. 11 is a diagram showing an example of input/output data that is acquired in relation to a design operation of the air conditioning equipment.

FIG. 11 shows an example of a design process list display unit 4 of the present Second embodiment. The design process list display unit 4 is configured from a data display unit 16, an input/output data acquisition button 17, and a design process list display button 18.

When the input/output data acquisition button 17 is clicked, input/output data acquired from the network 5 is displayed. Here, for example, in the case where a plurality of tasks are performed for one operation, several simultaneously-screen-displayed files may be displayed. By manually correcting the displayed input/output data, it is possible to keep only those regarding a target task.

Figure 12:
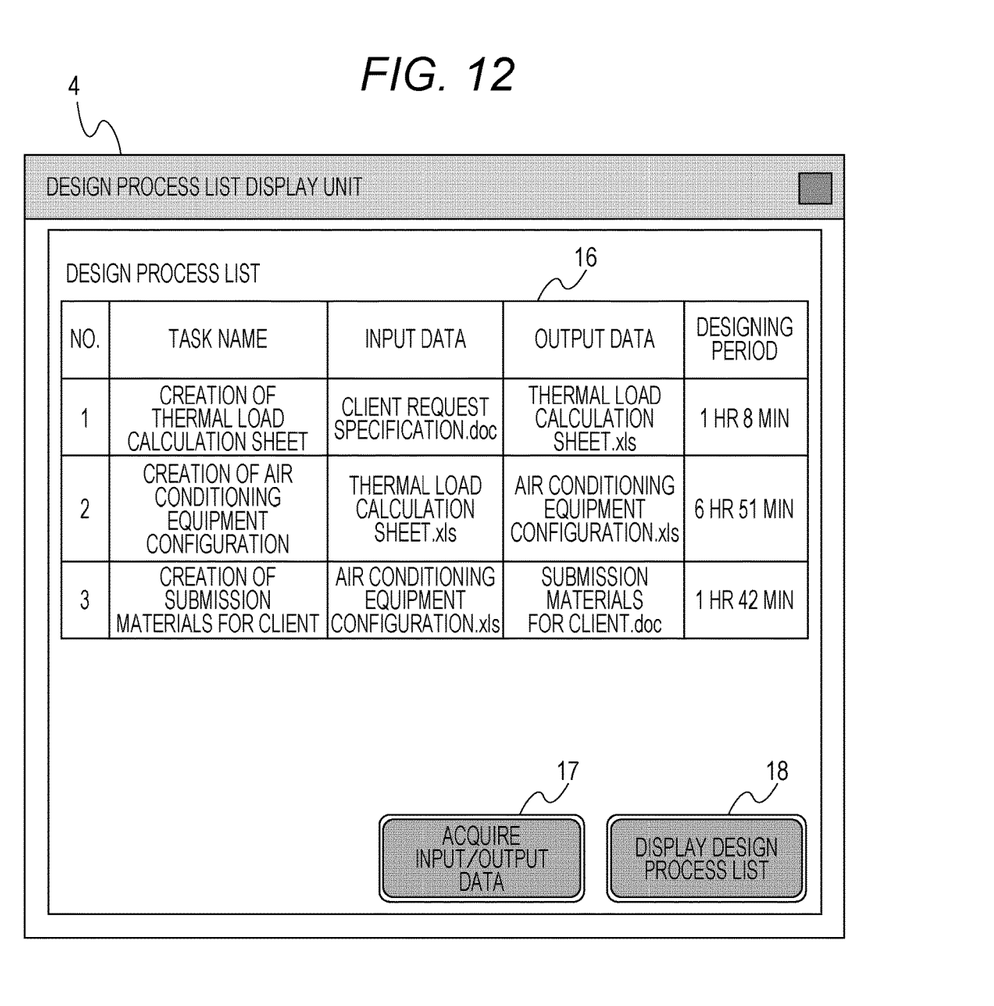
FIG. 12 is a diagram showing an example of a design process list that is created in relation to a design operation of the air conditioning equipment by using the design support device of the present invention.

FIG. 12 shows an example of the design process list display unit 4 displaying a design process list of the present example.

When the design process list display button 18 is clicked, the input/output data shown in FIG. 11 is processed by the design process list creation unit 3, and the design process list is displayed. Additionally, the design process list may be displayed even if display of the input/output data shown in FIG. 11 is not performed.

As described above, according to each embodiment of the present invention described above, a design process list may be created by the design support device, and hearing from designers over a long period of time, which was considered necessary for design operation analysis, and the effort needed to analyze the hearing result may be reduced.

What is claimed is:

1. A design support device connected to a network to which both an input/output device, that transfers design data, and a design data accumulation device, including a memory, for storing design data related to design process are connected, said design support device comprising:
   a computer executing a network monitoring unit configured for: extracting the design data from said network; comparing storage locations of input/output design data, and determining whether an input data portion and an output data portion of the input/output design data are related in common to the same design process;
   a computer executing a design process list creation unit configured for: creating a design process list indicating the design process including a plurality of tasks from design data by associating input/output design data for said input/output device acquired from said network on a per task basis, and arranging the tasks in an order of performance.

2. The design support device according to claim 1, wherein said design process list creation unit is further configured for: associating the input/output design data extracted from said network, creating a task name from an output data portion of the input/output design data, and calculating a designing period based on registration time of the input/output data.

3. A design support device that is connected to a network to which both an input/output device that transfers design data and a design data accumulation device including a memory for storing design data regarding design processes are connected, said design support device comprising:
   A computer executing a network monitoring unit configured for: monitoring said network, and extracting the design data from said network, and detecting input data which is design data that is input to said input/output device from said network and detecting output data which is design data that is output from said input/output device to said network, and comparing respective storage locations of the input and output data, and determining whether an input data portion and an output data portion of the input and output data are related in common to a same one of the design processes; a computer executing a design process list creation unit configured for: extracting, based on a relationship between information of the input data included in a monitoring log that is output from said network monitoring unit and information regarding the output data included in the monitoring log, each of the design processes corresponding respectively to a plurality of design items in the designing, creating a design process list by arranging in a list the design processes which have been extracted, and outputting the created design process list together with the information regarding the input data and the information regarding the output data.

4. The design support device according to claim 3, wherein said design process list creation unit is further configured for: associating the input/output design data extracted from said network, creating a task name from an output data portion of the input/output data, and calculating a designing period based on registration time of the input/output data.

5. The design support device according to claim 3, further comprising a design process list display unit for displaying the design process list created by said design process list creation unit.

6. The design support device according to claim 5, wherein said network monitoring unit is further configured for: extracting the design data from said network.

7. The design support device according to claim 6, wherein said network monitoring unit is further configured for: comparing respective storage locations of the input/output data, and determining whether an input data portion and an output data portion of the input/output data are related to a common design operation.

8. The design support device according to claim 5, wherein said design process list creation unit is further configured for: associating the input/output design data extracted from said network, creating a task name from an output data portion of the input/output data, and calculating a designing period based on registration time of the input/output data.

* * * * *